3,745,177
2-FERROCENYLTETRAHYDROFURAN
Orval E. Ayers, Huntsville, and Dennis C. Van Landuyt, Auburn, Ala., assignors to the United States of America as represented by the Secretary of the Army
No Drawing. Filed June 15, 1971, Ser. No. 155,673
Int. Cl. C07d 5/04
U.S. Cl. 260—346.1 M  1 Claim

ABSTRACT OF THE DISCLOSURE

The compound 2-ferrocenyltetrahydrofuran for use in solid propellant compositions as a ballistic modifier. This ballistic modifier, when used in propellant compositions, increases the burning rate and improves the performance of the particular solid propellant composition in which it is incorporated.

CROSS REFERENCE TO RELATED APPLICATION

This application is related to copending application Ser. No. 155,671, filed June 15, 1971.

BACKGROUND OF THE INVENTION

Solid propellant compositions are utilized extensively in rocket propellants. Still, there is a great need in perfecting ballistic modifiers for solid propellants to obtain faster burning rates and improve the performance of the solid propellants.

Therefore, it is an object of this invention to provide the compound 2-ferrocenyltetrahydrofuran.

Another object of this invention is to provide the compound 2-ferrocenyltetrahydrofuran as a liquid ballistic modifier for composite propellants.

Still another object of this invention is to provide the compound 2-ferrocenyltetrahydrofuran for use in solid propellant compositions to vary the burning rates of the solid propellants.

SUMMARY OF THE INVENTION

In accordance with this invention, the novel compound 2-ferrocenyltetrahydrofuran is provided by reacting $\beta$-ferrocenoylpropionic acid methyl ester dissolved in anhydrous tetrahydrofuran with a stirring mixture of tetrahydrofuran/lithium aluminum hydride. This novel compound is specially adapted for ballistic modification of composite solid propellants.

DETAILED DESCRIPTION OF THE INVENTION

Synthesis of 2-ferrocenyltetrahydrofuran. 70 grams of lithium aluminum hydride and 500 milliters of anhydrous tetrahydrofuran are added under a dry nitrogen atmosphere to a two liter round-bottom flask that is equipped with a mechanical stirrer, a reflux condenser, and an addition funnel. By means of the addition funnel, a saturated solution of $\beta$-ferrocenoylpropionic acid methyl ester (300 grams) dissolved in sufficient anhydrous tetrahydrofuran is added slowly to the stirring tetrahydrofuran/lithium aluminum hydride mixture.

When the addition of the ester solution is complete, the reaction mixture is refluxed for 1 hour and then deactivated by the slow addition of 200 milliters of ethyl acetate, 200 milliters of 40/60 acetone/water mixture, and diluted HCl in the order given.

The organic and aqueous layers are separated and the aqueous layer is discarded. The organic layer is washed with 200 milliliters of water, separated, dried over anhydrous calcium chloride, and stripped of solvents. A quantitative yield of 2-ferrocenyltetrahydrofuran is recovered as a light red liquid that has a boiling temperature of 131° C. at 1 mm. Hg.

Structural assignment for 2-ferrocenyltetrahydrofuran based on N.M.R. and I.R. spectral data gives a Nuclear Magnetic Resonance Spectral data of a triplet centered at 4.63 p.p.m. $J \approx 8$ cps.

The ballistic modifier 2-ferrocenyltetrahydrofuran is adapted for use with composite solid propellant compositions that generally contain a binder, a metal fuel, an oxygen oxidizer, processing aids and curing agents. For specific examples of propellant compositions that the ballistic modifier is used in, see copending application Ser. No. 155,671, filed June 15, 1971.

We claim:
1. The compound 2-ferrocenyltetrahydrofuran.

References Cited
UNITED STATES PATENTS 3,410,883  11/1968  Rosenberg _____ 260—439 CY
3,598,850  8/1971  Dewey _____ 260—439 CY CARL D. QUARFORTH, Primary Examiner
E. A. MILLER, Assistant Examiner U.S. Cl. X.R.
260—439 CY; 149—19